UNITED STATES PATENT OFFICE.

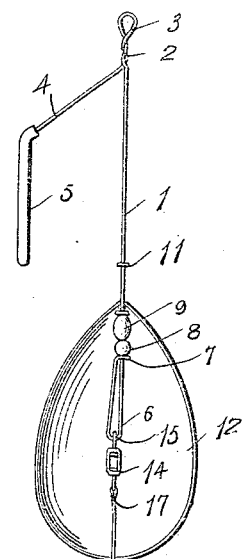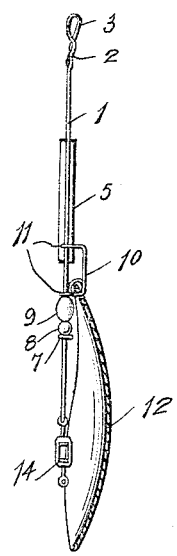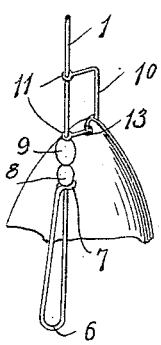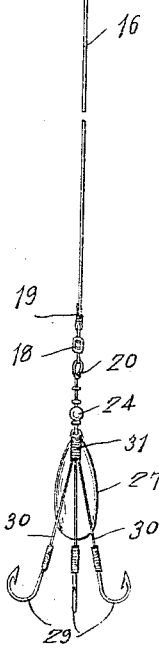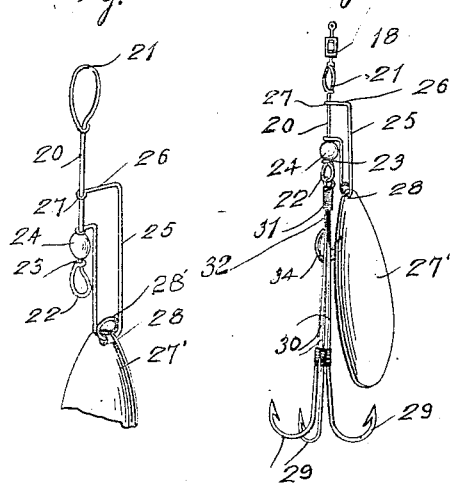

HENRY M. LAW, OF CORVALLIS, OREGON.

FISHING-TACKLE.

1,294,281.  Specification of Letters Patent.  Patented Feb. 11, 1919.

Application filed February 7, 1918.  Serial No. 215,844.

*To all whom it may concern:*

Be it known that I, HENRY M. LAW, a citizen of the United States, residing at Corvallis, in the county of Benton and State of Oregon, have invented certain new and useful Improvements in Fishing-Tackle; and I do hereby declare the following to be a full, clear, and exact description of the invention, such as will enable others skilled in the art to which it appertains to make and use the same.

This invention relates to improvements in fishing tackle.

An important object of this invention is to provide a fishing tackle especially adapted for trolling and provided with an attracter spoon fitted with a non-line-twisting device and cluster hooks to be attached to a leader and in turn connected to the attracter.

A further object of this invention is to provide a non-rotating stem provided with a ballast, on which stem is rotatably mounted an attracter spoon, a swivel carried by the stem, a leader line connected to the swivel and a trailer spoon connected to the free end of the leader line, and cluster hooks carried by the leader line and partially covered by the trailing spoon.

A further object of this invention is the provision of hooks provided with means whereby they may be detachably secured to a swivel which is connected to a leader line.

A still further object of this invention is to provide a novel form of hook whereby the bait may be suspended freely above the catching hooks.

With these and other objects in view, the invention consists in the novel combination and arrangement of parts hereinafter more fully described and set forth in the claims hereto appended.

In the drawings, wherein for the purpose of illustration is shown the preferred embodiment of my invention, Figure 1 is a side elevation of a fishing tackle embodied in the invention.

Fig. 2 is a fragmentary elevation of the same.

Fig. 3 is a detail plan view of the manner in which the device is assembled.

Fig. 4 illustrates a plan view of the stem which carries the relatively small attracting spoon, and Fig. 5 is a detail plan view of the relatively small attracting spoon and cluster hooks.

Like numerals of reference designate corresponding parts in all the figures of the drawings.

Referring to the drawings, the numeral 1 designates a stem formed of wire or other suitable material which has one end portion looped back upon itself, as at 2, to provide a connecting eye 3 for securing the stem to a fishing line. The free end of the twisted portion 2 diverges outwardly, as at 4, and has connected to its extremity, a weight 5 arranged parallel to the stem 1 and in spaced relation thereto. The opposite end portion of the stem 1 is looped upon itself, as at 6, and has its end looped about the stem 1, as at 7, to form a seat upon which rests a bead 8 of any desired color. The bead 8 is rotatably mounted on the stem 1, as is a larger bead 9. A U-shaped spinner 10 has the end portions of its arms terminating in loops 11 rotatably mounted on the stem 1, as illustrated in Fig. 2 of the drawings.

A relatively large concavo-convex attracting spoon 12, constructed of suitable material, is carried by the spinner 10. The connection of the attracting spoon 12 to the U-shaped spinner 10 permits the same to freely move through the water to attract fish within a radius of from fifty to two hundred feet.

A swivel 14 is connected, as at 15, to the looped portion 6 of the stem 1. A leader line 16 formed of gut, or other suitable material, has one end secured, as at 17 to the swivel 14. The gut is from two to four feet in length. A swivel 18 is secured, as at 19, to the free end of the leader line 16, and has connected to its lower end a second stem 20. The stem 20 has one end looped upon itself, as at 21, to provide an eye for securing the stem to the swivel 18. The lower end of the stem 20 is looped upon itself, as at 22, and surrounds the stem 20, as at 23. A bead 24 is rotatably arranged upon the stem 20. The bead 24 serves as a seat for a relatively large spinner 25. The spinner 25 is substantially U-shaped and has the bight portion of its arms bent to form eyelets 28'. A relatively small spoon 27' substantially ellipsoidal is provided at its smaller end with an opening 28 for securing the spoon to the bight portion of the U-shaped spinner 25.

A plurality of hooks 29 are provided with flexible stems 30 formed of gut or the like, which stems are connected by a member 31 to the loop 22 of the stem 20. With reference to Fig. 5 it will be apparent that the spoon 27 partially covers the cluster hooks.

When the line is thrown into the water, the fish upon being attracted will travel rapidly toward the relatively large spoon 12, and upon finding the same too large the fish will proceed to attack the smaller spoon. Upon attacking the smaller spoon he will be caught by the cluster hooks 29. Due to the pliability of the stems 30, it will be impossible for the fish to extricate himself from the hooks.

Having thus described my invention, what I claim is:

1. A device of the character described comprising, a weight-carrying stem, a spinner rotatably mounted on the stem, a relatively large attracting spoon carried by the spinner, a swivel connected to the stem, a leader line connected to the swivel, and a relatively small attracting spoon and cluster hooks carried by the free end of the leader line, as and for the purpose specified.

2. In a device of the character described, a stem having one end thereof looped to provide an attaching portion for securing the stem to a fishing rod, a ballast carried by one end of the stem, the opposite end of the stem being looped to provide a seat, beads rotatably mounted upon the stem and upon the seat, a spinner rotatably mounted upon the stem, a relatively large spoon carried by the spinner, a swivel connected to the free end of the stem, a leader line connected to the swivel, and a relatively small attracting spoon having cluster hooks swivelly connected to the free end of the leader lines.

3. In a device of the class described comprising a weighted stem, a relatively large attracting spoon pivotally mounted on the stem, a flexible leader line connected to the stem, a second stem swivelly connected to the leader line, a spinner rotatably mounted on the second stem, a relatively small attracting spoon carried by the second spinner, and a cluster of hooks connected to the last-named stem, as and for the purpose specified.

4. In a device of the class described including a cluster of hooks having secured to their ends pliable stems, and means for securing the free ends of the stems to a leader line, as and for the purpose specified.

5. In a device of the class described including a leader line, a swivel connected to the leader line, a stem connected to the swivel, a small spoon rotatably mounted on the stem, hooks, said hooks arranged with their pointed ends outwardly, flexible stems connected to the shanks of the hooks, means for connecting the free ends of the flexible stems together, and means carried by the connecting portion for detachably securing the same to the stem, as and for the purpose specified.

In testimony whereof I affix my signature in presence of two witnesses.

HENRY M. LAW.

Witnesses:
G. A. LAW,
EMERY J. NEWTON.